United States Patent [19]

Dolby et al.

[11] Patent Number: 5,166,850
[45] Date of Patent: Nov. 24, 1992

[54] RIGID, WEDGE-SHAPED MOUNTING STRUCTURE FOR MINIMIZING RESONANCES TO ALLOW RAPID TRANSVERSE MOVEMENT OF AN ATTACHED HEAD

[75] Inventors: Dale P. Dolby, Beaverton, Oreg.; Steve L. Magnusson; William N. Aldrich, both of Redwood City, Calif.; Larry A. Price, Colorado Springs, Colo.

[73] Assignee: Ampex Corporation, Calif.

[21] Appl. No.: 640,382

[22] PCT Filed: Apr. 7, 1989

[86] PCT No.: PCT/US89/01467

§ 371 Date: Jan. 10, 1991

§ 102(e) Date: Jan. 10, 1991

[51] Int. Cl.⁵ .................. G11B 5/588; G11B 5/52; G11B 21/10

[52] U.S. Cl. .................. 360/77.13; 360/106; 360/109

[58] Field of Search ... 360/106, 109, 104, 77.12–77.17

[56] References Cited

U.S. PATENT DOCUMENTS 4,337,492  6/1982  Brookhart et al. ............... 360/109

Primary Examiner—Robert S. Tupper
Attorney, Agent, or Firm—George B. Almeida

[57] ABSTRACT

An improved head mounting assembly includes a wedge-shaped rigid head support member which minimizes resonances when operating at rapid transverse head movements, and which operates in conjunction with a photo-sensitive head positioning apparatus, to provide improved tracking for a transducing head mounted on the member.

16 Claims, 9 Drawing Sheets

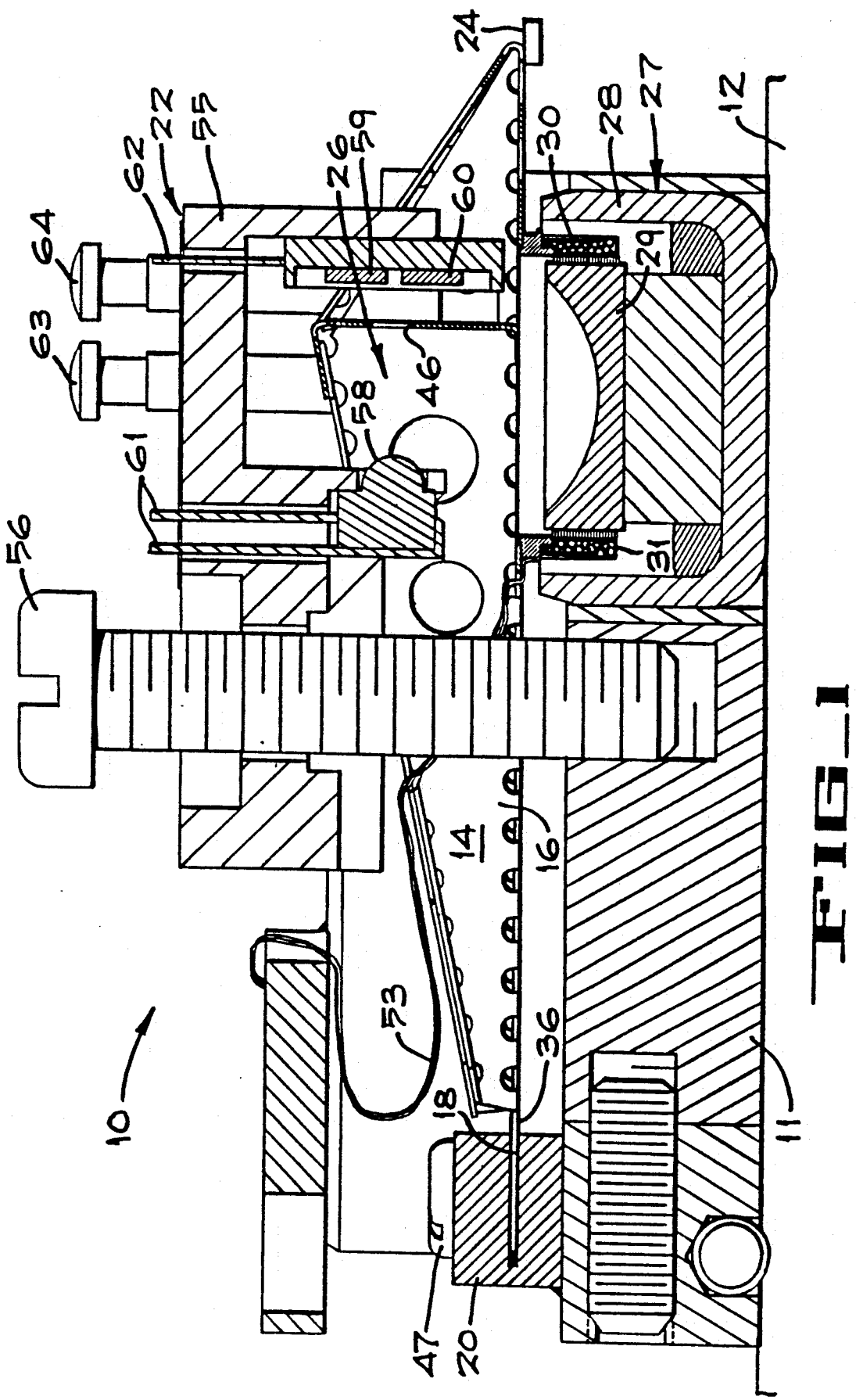

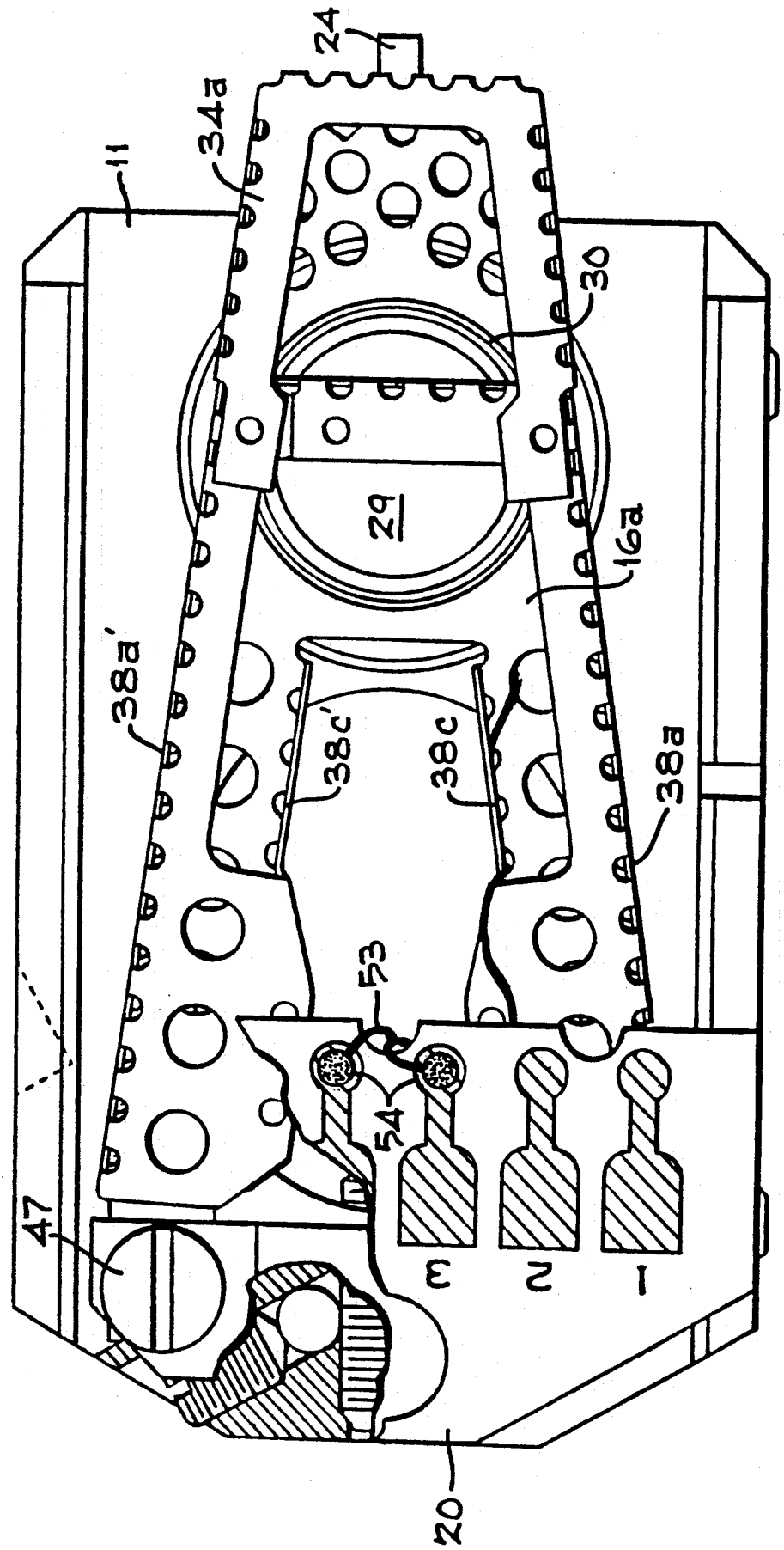
FIG_2

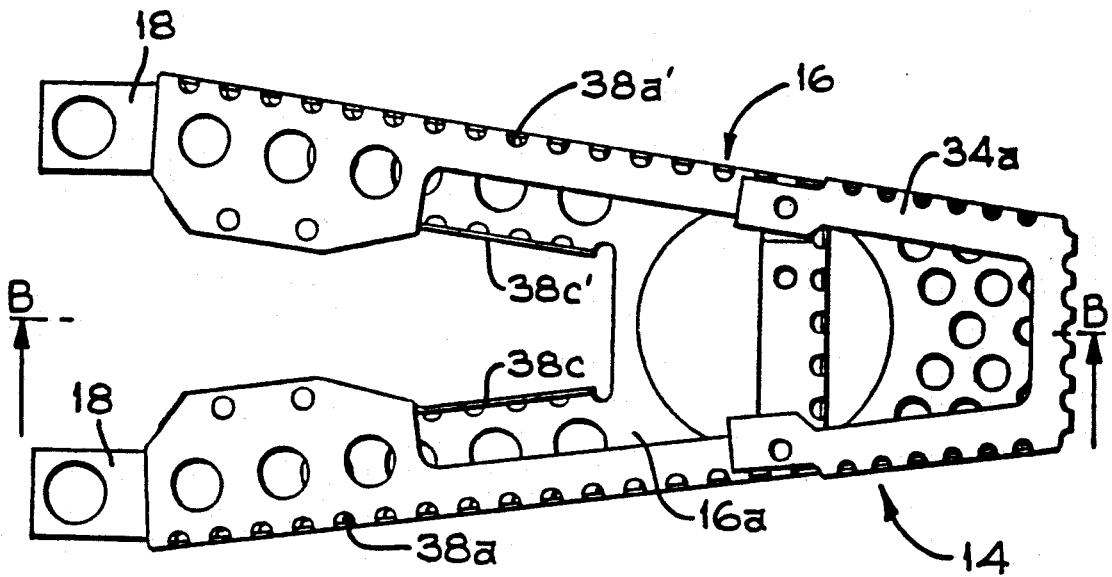
FIG_3A
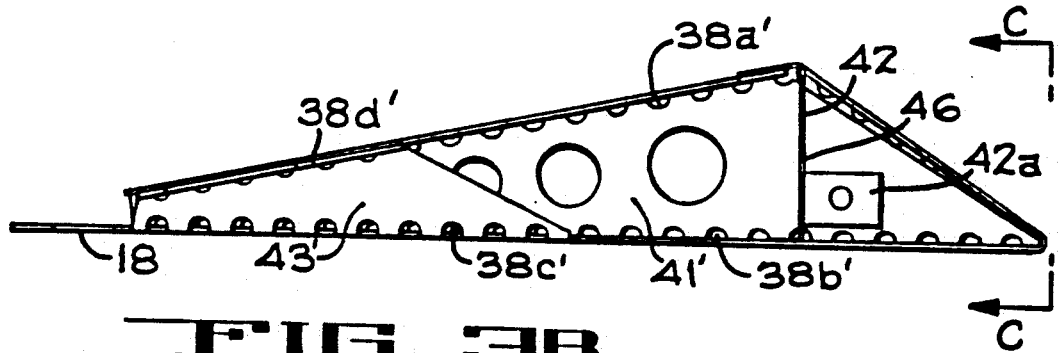
FIG_3B
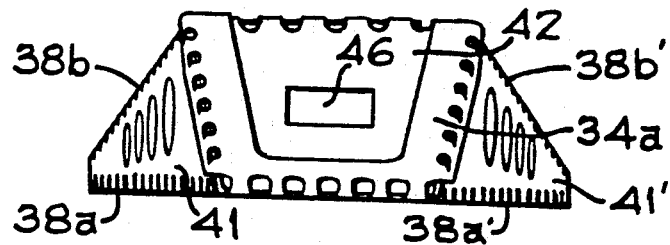
FIG_3C

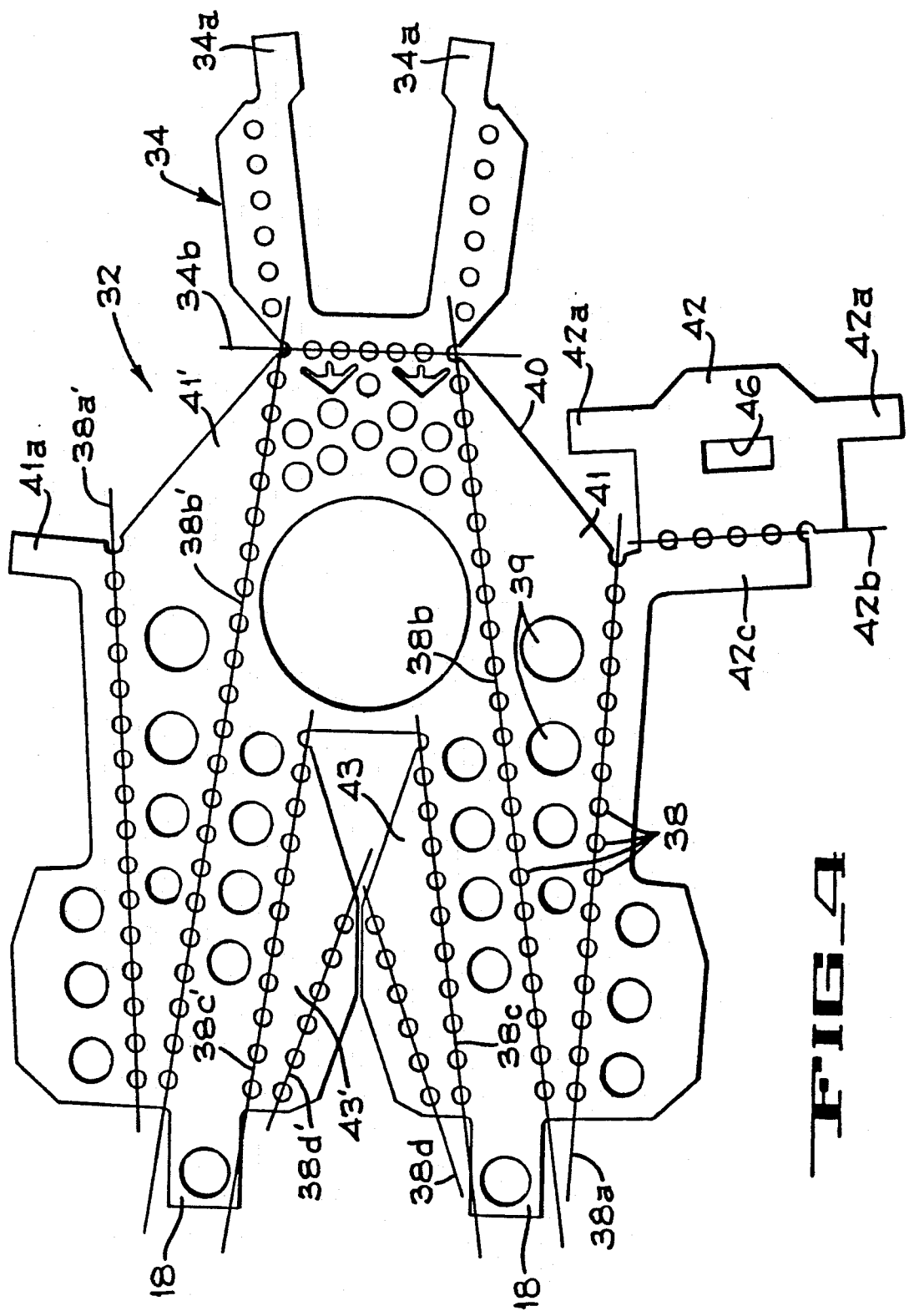

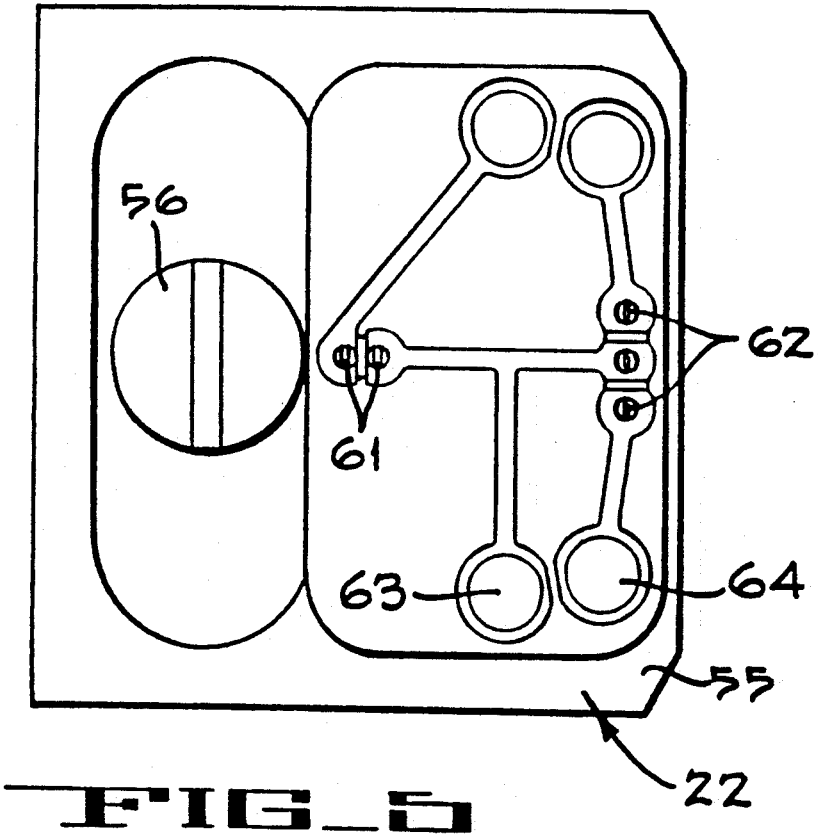
FIG_5

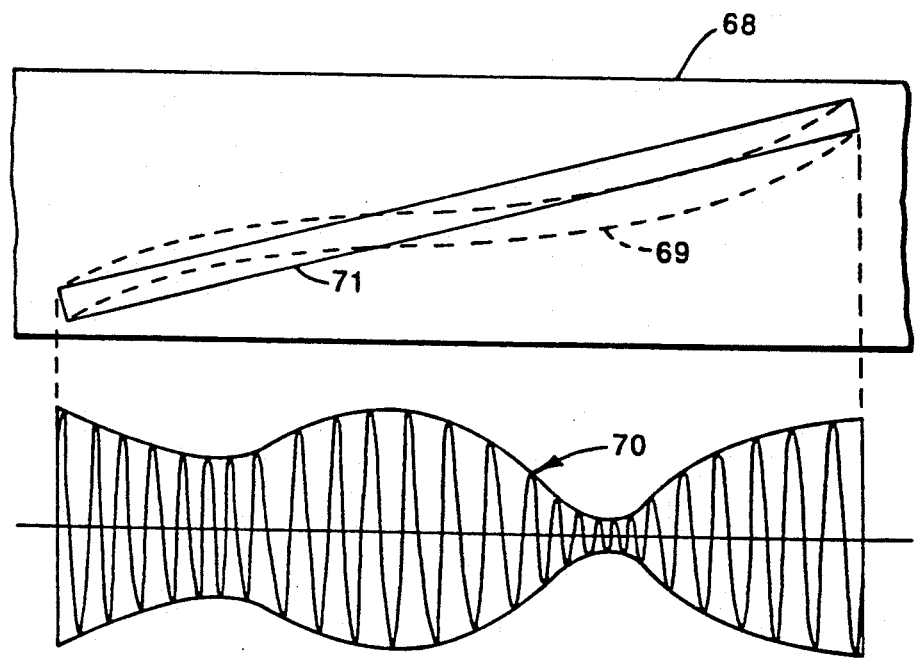
FIG_6
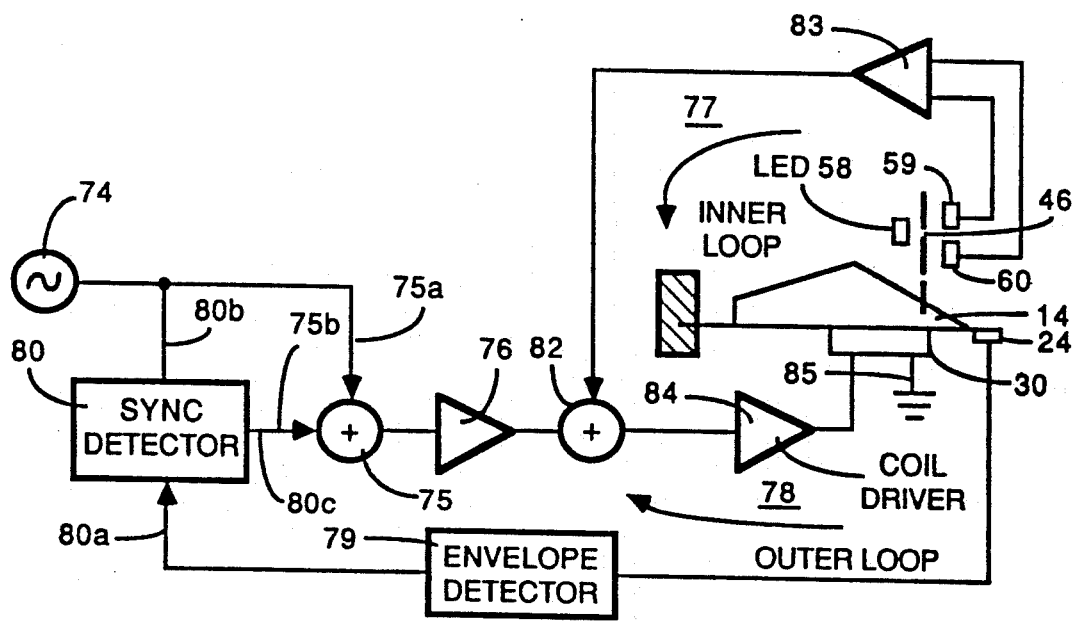
FIG_7

RIGID, WEDGE-SHAPED MOUNTING STRUCTURE FOR MINIMIZING RESONANCES TO ALLOW RAPID TRANSVERSE MOVEMENT OF AN ATTACHED HEAD

FIELD OF THE INVENTION

This invention relates to an improved mounting assembly for a magnetic transducing head, the mounting assembly permitting rapid and precisely repetitive lateral displacement of the head in a direction transverse to the recorded track provided on a magnetic tape, thus permitting the head to follow the recorded track more accurately.

BACKGROUND OF THE INVENTION

In the prior art the transducing head is mounted on a flexible longitudinal leaf member, the leaf member mounted as a cantilever beam, secured at one end to a mounting base to extend outwardly from the base and support a transducing head at the free end of the beam. In the helical-scan magnetic tape transport art, one or more of these leaf-type members may be used, each mounted at the interior of a rotating drum, to extend radially toward the periphery of the drum, the head protruding through an opening in the drum to traverse or scan the recorded tracks on a magnetic tape curved around the periphery of the drum in a helical path.

A mounting arrangement as described above typically incorporates a mechanism for driving the leaf member, such as a voice coil assembly interactive with the leaf member for positioning the head by means of a feedback circuit connected between a head positioning apparatus and the voice coil assembly. However, a significant disadvantage of such a head positioning arrangement is the limitation of head positioning parameters to relatively low speed displacements, since the relatively long and thin head positioning member will not uniformly bend at high speeds. That is, the inherent flexibility of the long, thin head positioning member sets up undesirable resonances in the member under rapid and repetitive flexure loadings. Such resonances also result in undesirable changes in the bending moment under repeated flexures of such member. The occurrence of such conditions in the member under the desired loading sequence severely impairs the ability of a head mounted on the member to follow a tape track recorded on a magnetic tape.

One prior art support structure for a transducing head is shown in U.S. Pat. No. 4,212,043 by Baker entitled "Magnetic Transducing", issued Jul. 8, 1980 and assigned to the assignee of the present invention.

However, that patent, although displaying a more stable structure presents a structure which is directed to controlling the movement of a head stack having multiple heads disposed adjacent a magnetic tape. The movement of a head stack has to be parallel to the plane of the tape to enable each head in the stack to follow a respective track on the tape. A single head mounted on a leaf member is positioned to engage a single tape track, and positioning of that single head by a cantilever bending element is viable because of the relatively small displacements involved. Further, the patented structure is also directed to solve certain problems introduced by centrifugal forces bearing against the support structure and not problems relating to rapid and repetitive displacement of the transducing heads. Moreover, the structure of the device described in the aforementioned patent is not amenable to the swift and repeated displacements required in a system directed to the rapid processing of data, i.e., a digital tape transport.

SUMMARY OF THE INVENTION

Accordingly, the mounting assembly of the present invention is directed to an apparatus and method for use in a magnetic recording system which requires rapid and repetitive positional changes of the transducing head with respect to the data tracks, such transducer mounting assembly requiring a bending member of light-weight construction, but having sufficient rigidity along the major portion of its length to minimize changes in the bending moment under rapid changes in head position The present invention produces a more stable structure and an improved RF output at the head Moreover the present invention includes an improved bending structure which aligns the head with the neutral plane of the bending element associated with the mounting structure Alternative configurations are also shown. A photo-cell arrangement associated with the head positioning apparatus is responsive to small changes in head position to precisely drive a voice coil motor associated with said apparatus.

Accordingly, the transducer mounting assembly of the present invention incorporates a longitudinal head support member structured to provide a light-weight, but substantially rigid, longitudinal main body portion of wedge-like shape and including a relatively short, simple hinge flexure extending from the rigid main body portion and secured to a base. To accomplish a lightweight but rigid construction, the head support member is formed from a single thin sheet of a light weight metal, i.e., stamped aluminum, and folded into a hollow outer frame having a wedge-like shape of a form which maximizes the rigidity of the member. To maximize head contact with the tape during deflection, the head mounting portion of the outer end of the rigid member is so positioned as to align the longitudinal mid-plane of the track width associated with the head with the horizontal neutral plane of the rigid member. Moreover the assembly of the present invention incorporates an improved head positioning apparatus for the head mounting assembly, said head positioning apparatus including a photo-cell arrangement which responds quickly and precisely to relatively small changes in head position to supply head positioning information to a voice coil drive motor positioned on the mounting assembly to drive and position the member with speed and accuracy under rapid and repetitive displacement of the transducing heads.

DESCRIPTION OF THE DRAWINGS

FIG. 1 is a side elevation of the head mounting assembly of the present invention taken along the lines 1—1 of FIG. 2;

FIG. 2 is a top plan view of the head mounting assembly of FIG. 1 with portions removed for clarity;

FIG. 3A is a top plan view of the head support member of FIG. 1;

FIG. 3B is a sectional view taken along the lines B—B of FIG. 3A;

FIG. 3C is a front elevation taken along the lines C—C of FIG. 3B;

FIG. 4 is a top plan view of the blank from head support member is formed;

FIG. 5 is a top plan view of the head clamp assembly of the head mounting assembly shown in FIG. 1;

FIG. 6 is a schematic illustration of a magnetic tape and a tape track thereon;

FIG. 7 is a schematic diagram of a circuit designed to control the tape tracking of a head mounted on the support member;

DESCRIPTION OF THE PREFERRED EMBODIMENTS

Figure 8:
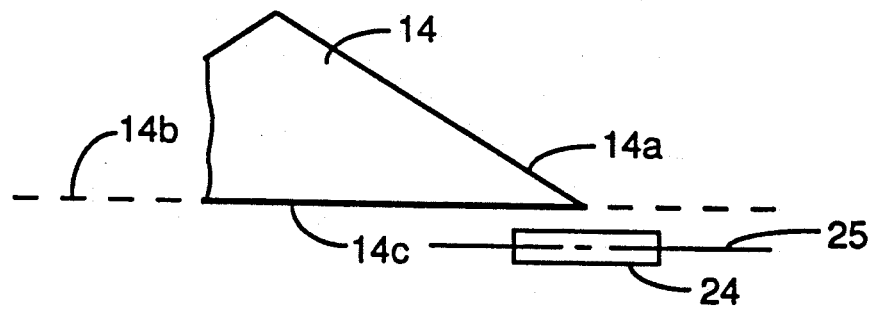
FIG. 8 is a schematic representation of a portion of the head mounting structure of a first embodiment of the present invention, showing a outer end of a longitudinal member of the structure, and the position of a transducing head with respect thereto, the head so mounted on said member as to dispose a mid-plane of the track width defined by the head a small distance below the horizontal neutral plane of said member.

As shown in FIGS. 1 and 2, embodiment one of a head mounting assembly 10 disposed in a scanner (not shown), comprises a base 11, mounted on a base plate 12, and a transducer or head support member 14, including an elongated, wedge-shaped frame or main body portion 16 and a pair of hinges 18 extending from one end of the member 14 to engage a clamping member 20 of the base 11. A head clamp assembly 22 is disposed at the end of the support member 14 opposite the hinges 18 to support a transducer position sensing apparatus 26. Underlying the clamp assembly 22 is a voice coil mechanism 27, disposed adjacent the base 11, and including a motor support 28 and a voice coil motor 29. The motor 29 is disposed to receive a complementary coil element 30 mounted on the bottom of the support member 14 adjacent the position sensing apparatus 26, in a cylindrical gap 31 provided in the motor 29 and aligned with the element 30. The motor 29 operates in conjunction with the positioning apparatus 26, through circuitry described below, to position a head 24, mounted at the end of the member 14 opposite the hinges 18. The voice coil mechanism 27 rests on the base plate 12, which is the bottom plate 12 of the rotating upper drum (not shown) of the scanner.

Of particular interest in the present invention is the form and structure of the wedge-shaped head support member 14, such structure better seen in FIGS. 3 and 4. The member 14 is formed as an outer frame 16 from a single, flat, sheet-like element 32, as shown in FIG. 4. The sheet 32 may be formed from any suitable lightweight material, but it is preferable that the material is thin, flexible and easily etched; e.g., thin sheet aluminum. The flat sheet 32 is struck in a complex form which is generally concentric about a center line 32a and includes a head support structure 34 at the front and a pair of flat, flexible hinges 18 at the rear. Holes 38, 39 are etched in the sheet 32. The holes 38 are all of a relatively similar size and form such linear arrays as 38a and 38b to provide fold lines for use in forming the sheet 32 into the rigid, wedge-shaped, beam-like frame 16 of the member 14. The holes 39, of varying sizes, serve only to reduce the weight of the frame 16 at those points on the sheet 32 where the removal of material will not affect the rigidity of the frame 16.

Moving from the bottom of the sheet 32 in FIG. 4, and upward toward the center line 32a, the main body portion 40 of the member 32 not only includes the fold lines 38a and 38b, but also fold lines 38c and 38d. Corresponding fold lines 38a', b', c' and d' are shown on the upper half of the member 32. To orient the sheet 32 with the structure of the head support member 14, the fold lines 38a–38d and 38a40 –38d' are also shown in FIGS. 3A-C, with the sheet 32 being folded upwardly and outwardly from the plane of the paper as shown in FIG. 4, to dispose respective side walls 41 and 41' between fold lines 38a, b and 38a', b'. When the sheet 32 is folded, a flap 42 with outwardly extending ears 42a, at opposite ends thereof, is carried inwardly to first pivot about the fold line 38a to dispose the flap 42 concentrically about the center line 32a, with a respective ear 42a folded to engage each of the side walls 41, 41'. A flap 41a', on side wall 41' is tucked under an upper extension 42c of the flap 42, adjacent the fold line 42b. The head support structure 34 comprises a generally U-shaped forward extension of the sheet 32 including leg portions 34a, which are folded rearwardly about a fold line 34b to engage the flap 42 pivoted about the fold line 42b, the flap 42 folded sufficiently to dispose the flap 42 perpendicular to the base of member 14, with the ends 34a of the extension 34 overlying flap 42 at an upper end thereof, with the members 34, 42 thereafter to be held in place as by welds 44. Also provided within the flap 42 is a head window 46.

The completed member 14, as shown in FIGS. 3A-C, comprises an open framework of longitudinal elements which form a substantially rigid, but lightweight wedge-shaped, beam-like structure sufficiently rigid to minimize changes in its bending moment under rapid changes in head position. From the truncated triangular base 16a, of main body portion 16, to a similar triangular structure in both outer walls 41, 41' and inner walls 43, 43', a substantial design effort was undertaken to minimize weight, maximize rigidity and eliminate undesirable resonances in order to achieve an optimum weight-to-strength ratio.

As shown in FIGS. 1 and 2, the member 14 is mounted in the base 12 with the hinges 18 held in place in the clamping member 20 on opposite sides of the center line 32a by fasteners 47. A relatively small area of flexure 36 is provided in each hinge 18 between the main body portion 16 of the member 14 and the base 11. The voice coil mechanism 27 underlies the head support member 14 in the area of the window 46. Connectors 53 connect the voice coil element 30 on the support member 14 to terminals 54 provided on the base 11. Overlying the voice coil motor 29 is the head clamp assembly 22.

As seen in FIG. 1, the head clamp assembly 22 comprises a main body portion 55, secured to the base 11 by a fastener 56. Mounted in the main body portion 55 forward of fastener 56 is the position sensing apparatus 26, comprising a light emitting diode (LED) 58 and upper and lower photo-voltaic light sensing cells 59, 60. The position sensing apparatus 26 is so disposed in the main body portion 55 that when the assembly 22 is mounted on the base 11 to overlie the member 14, the LED 58 is placed on one side of the window 46 in the member 14 and the photocells 59, 60 are placed on the opposite side. Circuit elements 61 connected to the light emitting diode 58 and circuit elements 62 connected to the photocells 59, 60 are in turn connected to conductive posts 63 and 64 respectively. The posts 63, 64 are interconnected to a servo circuit 66 interacting with the voice coil motor 29 to position the transducer or head 24 mounted at the outer end of the head support member 14.

As the voice coil motor 29 moves the member 14 and the head 24, the amount of light falling on each of the photocells 59, 60 varies as a function of position. That variance is converted to an electrical signal of a magnitude defined by the difference in the amount of light received by the cells 59, 60 in the circuit 66 (FIG. 7) and thereafter used by the circuit 66 to position the head 24 on a tape track.

In FIG. 6 a section of magnetic video tape 68 is schematically shown with one track 69 of data (depicted in a dashed line) previously recorded by a helical scan video tape recorder. As previously mentioned, during data recording and reproducing operations, the tape is guided under tension so that recording occurs under a recommended standard value of longitudinal tension, which induces a certain degree of stretching of the tape. If the tape is played back at a different tension because of faults in the tensioning mechanism, or because of unavoidable variations in the mechanisms of different machines, then the length, straightness and inclination of the data relative to the video head track will be different. Under such circumstances, the head will not perfectly follow the data track, leading to undesirable variations in the strength of the reproduced signal such as variations in the amplitude of the RF envelope 70. A similar effect results if the correct tension is used on playback, but the tape has shrunk or elongated due to changes in atmospheric or storage conditions, e.g., temperature or humidity. Also, irregular tape edges and differences in edge-guiding effects from machine to machine, can cause irregularly wandering tracks or scans. Consequently the path 71 taken by the video head 24 during reproduction as it scans the tape 68 often fails to exactly coincide with the recorded track 69. In actual practice it has been found that even slight deviations between the recorded track 69 and the path 71 taken by the reproduce head 24 can result in significant deterioration in the quality of the reproduced video signal.

Accordingly, to minimize the deviations noted above between the recorded track and the path 71 taken by the reproduced head 24, the structure of the present invention has been further modified to assure that the movement of the member 16 corresponds more exactly to the movement of the head 24. For example, in FIG. 8, the outer end 16a of the member 16 carries the transducer or head 24 below the end 16a, disposing a longitudinal mid-plane 25 of the head 24 below a plane defining the lower face 16c of the member 16 and therefore below a neutral plane 16b which is co-extensive along the member 16 with the mid-plane of the hinge. Because the bending axis associated with head deflection is more precisely a series of bending axes whose radii decrease as the deflection of the member 16 increases, it is desirable to align the track associated with the head with the horizontal neutral plane of the member so as to minimize asymmetries occurring across the deflection range of the head, particularly since such asymmetries diminish the quality of head output.

Figure 9A:
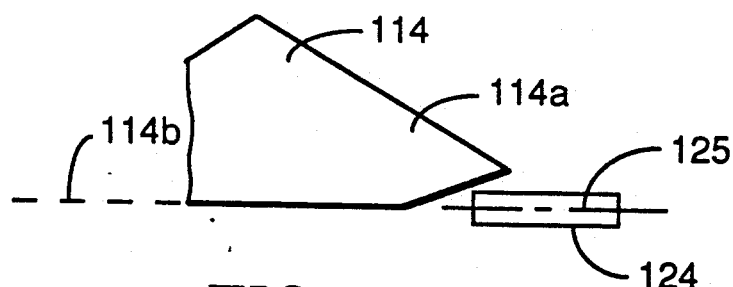
FIG. 9A is a schematic representation of a portion of a second embodiment of the improved head mounting structure of the present invention, wherein the outer end of a longitudinal member of the structure is tilted upwardly to position a longitudinal mid-plane of the track-width as defined by the head in alignment with the horizontal neutral plane of the member.

In a second embodiment of the present invention, which uses the mounting structure shown in FIGS. 1-5, and is shown FIG. 9A, to align a longitudinal mid-plane 125 of a transducer or head 124 with a horizontal neutral plane 116b (the plane co-extensive with the mid-plane of the hinge) of a member 114 the member 114 was modified to provide a tilted outer end 114a, the outer end 116a of the member 114 tilted upwardly to accommodate the transducing head 124 at the bottom thereof. The desired configuration mutually aligns the horizontal neutral plane 114b of the member 114 with a longitudinal mid-plane 125 associated with the track width of a track generated by the head 124. With the neutral plane 114b of the member 114 aligned with a longitudinal mid-plane 125 of the track width defined by the transducer 124, distortion of the RF envelope during deflection of the head 124 is minimized.

Figure 9B:
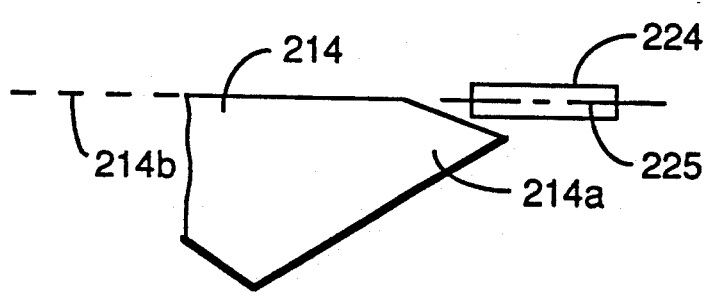
FIG. 9B is a schematic representation of a portion of a third embodiment of the improved head mounting structure of the present invention, wherein the outer end of a longitudinal member of the structure is tilted downwardly to position a longitudinal mid-plane of the track width as defined by the head in alignment with the horizontal neutral plane of the member.

In FIG. 9B, a third embodiment of the head support structure described above is shown, wherein an outer end 214a of member 214 is tilted down downwardly to accommodate engagement of a transducing head 224 therewith, and a mid-plane 225, associated with a track width generated by the transducing head 224, is aligned with a neutral plane 214b of the member 214.

Figure 9C:
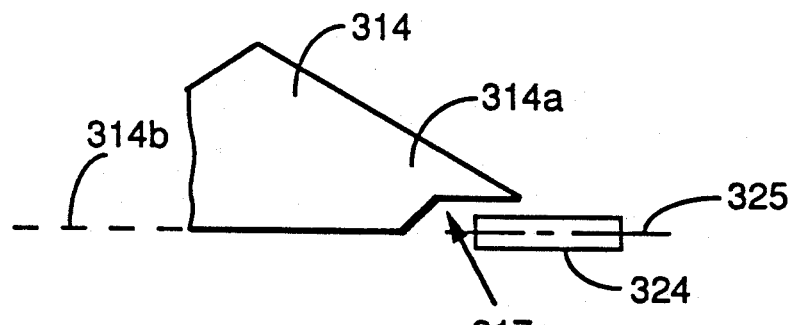
FIG. 9C is a schematic representation of a portion of a fourth embodiment of the improved head mounting structure of the present invention, wherein the outer end of a longitudinal member of the structure has an upwardly directed notch provided therein, whereby the head is positioned in the notch so as to align a longitudinal mid-plane of the track width as defined by the head with a primary horizontal neutral plane of the member.

A fourth embodiment of the head support structure is shown in FIG. 9C wherein an outer end 314a of a member 314 includes a lower notch 317 so positioned as to engage a transducing head 324 to align the longitudinal mid-plane 325 associated with its track width with a neutral plane 314b of the member 314.

Figure 9D:
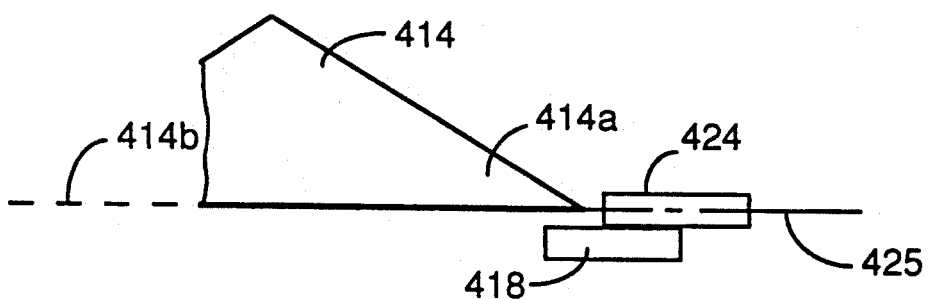
FIG. 9D is a schematic representation of a portion of a fifth embodiment of the improved head mounting structure of the present invention, wherein the outer end of a longitudinal member of the structure receives a head support member which also engages the head to align a longitudinal mid-plane of the track width as defined by the head with the horizontal neutral plane of the member.

A fifth embodiment is shown in FIG. 9D wherein a head mounting plate 418 is disposed at an outer end 414d of a member 414 and displaced sufficiently below the outer end 414a so that a transducing head 424 can be mounted thereon, with the longitudinal mid-plane 425 associated with its track width aligned with a neutral plane 414b of the member 414.

Figure 9E:
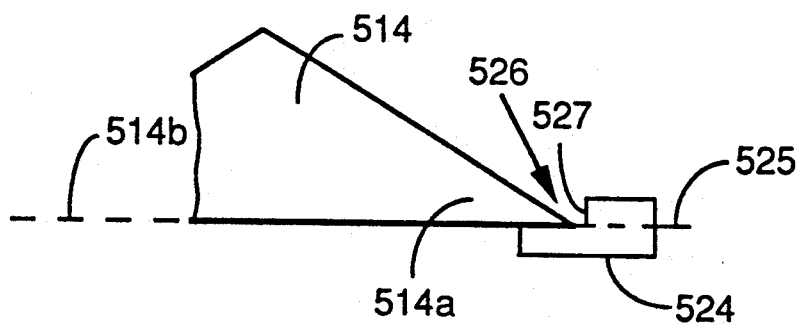
FIG. 9E is a schematic representation of a portion of a sixth embodiment of the improved head mounting structure of the present invention, wherein the outer end of a longitudinal member of the structure engages a notch provided at the rear of the head to align a longitudinal mid-plane of the track width as defined by the head with the horizontal neutral plane of the member.

A sixth embodiment of the present invention is shown in FIG. 9E wherein a notch 526 is provided at a rear face 527 of a transducer 524. In the embodiment of FIG. 9E an outer end 514a of a member 514 is received in the notch 526 to align a neutral plane 514b of the member 514 with a longitudinal mid-plane 525 associated with the track width of head 524.

Figure 10:
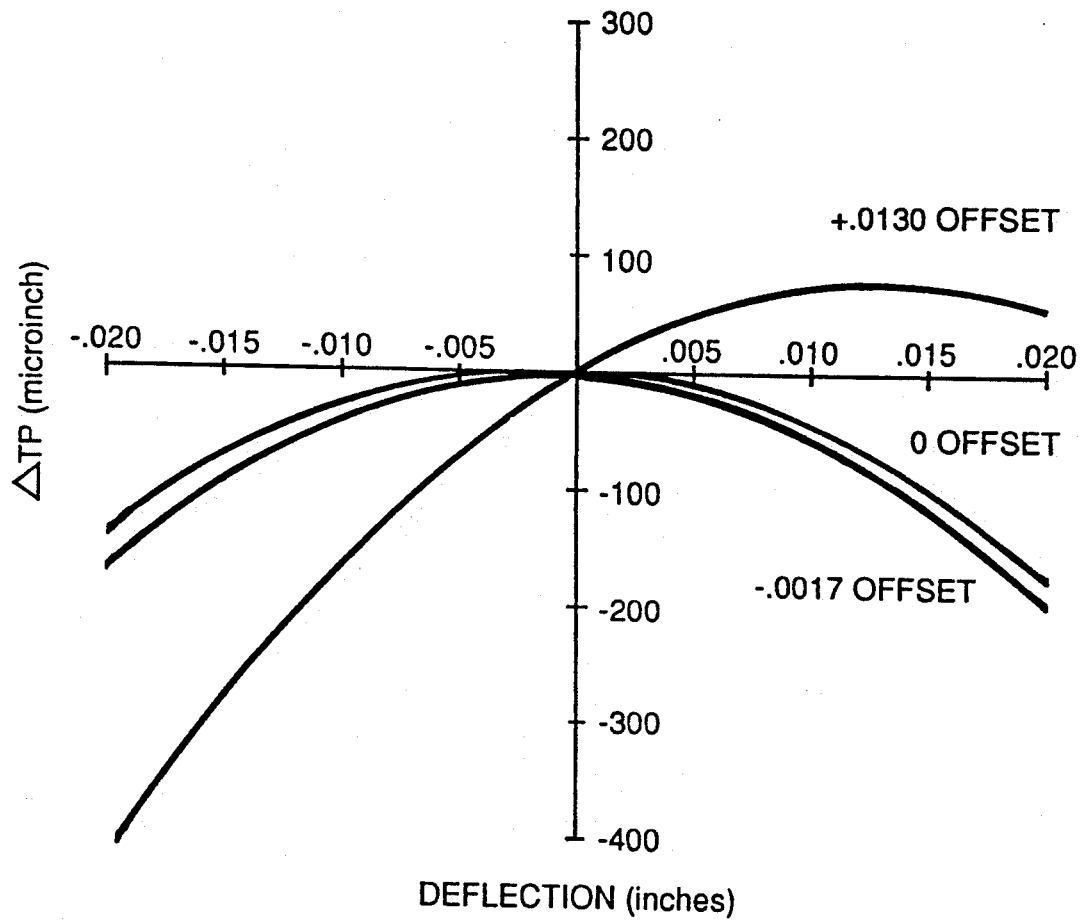
FIG. 10 is a graph which compares head tip penetration across the entire head deflection range for the current structure, the proposed structure, and a modification of the proposed structure.

Each of the embodiments shown is to dispose the mid-plane of the track width as defined by and associated with the head 24 in alignment with the horizontal neutral plane 14b of the member 16. In FIG. 10 each curve represents a tip projection differential achieved during the deflection cycle, over the entire range of deflection. When the head is displaced from the neutral plane, as in the 13 mil offset curve, there is a substantial difference in tip penetration differential at opposite ends of the range, from −400 micro inches at end of the range to +70 micro inches at the opposite end. Such a configuration results in substantial distortion of the RF envelope, and a loss in picture quality.

More favorable tip projection profiles are achieved with a zero (0) offset curve. With a zero offset it can be readily seen that tip penetration falls within range of a −120 to −150 micro inches at respective opposite ends of the range, eliminating asymmetries in the curve, and thus minimizing distortion of the RF envelope. An alternative configuration, which displaces the mid-plane of the track width defined by the head 24 slightly above the neutral plane 16b, also produced a symmetric deflection curve and is shown as the −0.0017 offset curve. In such a configuration, the amount of distortion produced is comparable to the zero (0) offset curve, but a slight improvement of the RF envelope may be produced. Accordingly it is desirable to achieve the alignment of the mid-plane 25 of the track width of the head 24 with the horizontal neutral plane 16b of the member 16. Moreover the net effect achieves, in the embodiments of FIG. 9A through 9E, an improved head tip penetration profile resulting in an improved RF output.

Referring to FIG. 7, the servo circuit 66 for maintaining a video reproduce head 24 in the optimum transducing relationship with respect to a track 69 extending obliquely across the tape 68 is shown. A dither oscillator 74 generates a sinusoidally varying signal at a fixed frequency $f_D$. To avoid harmful signal interferences with the recorded video signal reproduced by the head 24, the dither oscillator 74 is operated to provide a pure sinusoidally varying signal at the fundamental frequency $f_D$ preferably having less than 1% higher order harmonic content. The output of oscillator 74 is fed to one input 75a of a summing circuit 75 where it is added to a low rate or DC error correction signal, present at an input 75b. The output of summing circuit 75 is amplified by a drive amplifier 76 and the amplified signal is coupled to an inner loop 77 to drive the head 24. The oscillator drive signal excites the coil element 30 to impart a small peak-to-peak (preferably 10% to 15% of the width of track 69) oscillatory motion (dither) to the head 24 to cause the head to move laterally to the track 69 alternately between limits as it scans the track to reproduce the recorded signal. Thus, the drive amplifier 76 is arranged to provide an oscillatory drive signal that causes the head 24 to oscillate or dither laterally to each track and about the head's home position as it follows the track 69.

The oscillatory motion imparted to the head 24 causes an amplitude modulation of the reproduced signal, which, when recording video or other such high frequency signals, is in the form of an RF envelope of frequency modulated carrier. Because the magnitude of amplitude deviations in the modulation of the RF envelope are used to maintain the head in the desired transducing position with respect to the track 69, the precision with which such position is maintained is dependent upon the sensitivity of the servo drive circuit 66 and how free the reproduced RF envelope is from spurious modulations.

Dithering of the head 24 causes an amplitude modulation of the reproduced RF envelope. If the head 24 is located at the center of the track 69, only even harmonic components of the dither signal are produced by the action of the head 24, because the average head position is at track center and the envelope variation caused by dithering appears as a symmetrical function The amplitude of the RF envelope reproduced from the tape 68 is maximum at track center. As the head 24 moves to either side of track center, the amplitude of the reproduced RF envelope decreases by the same amount. The fundamental of the dither signal is, thereby, balanced out and does not appear as RF envelope modulation. Therefore, dithering the head 24 laterally to the track 69 introduces amplitude deviations in the RF envelope only at twice the dither frequency, $f_D$.

On the other hand, if the head 24 is located slightly off the center of the track 69 to either side, the reproduced RF envelope amplitude variation will no longer be symmetrical because head 24 excursions to one side of the track 69 will produce a different RF envelope amplitude decrease then produced by an excursion towards the opposite side. Hence, the maximum to minimum envelope amplitude variation occurs once for each cycle of the dither signal, or at the dither frequency, $f_D$ with the order of occurrence of the maximum and minimum points depending upon the side of track center to which the head 24 is offset. The fundamental of the dither frequency is no longer balanced out and the reproduced RF envelope variations will exhibit a fundamental component of the dither frequency, with the phase of the fundamental component for an offset to one side of the center of the track 69 180° out of phase with respect to that for an offset to the other side of track center. Detection of the order of occurrence of the maximum and minimum points, hence phase of the envelope amplitude variations, provides information definitive of the direction the head 24 is offset from the center of track 69 and detection of the envelope amplitude variation provides information definitive of the amount of offset, or a track error signal.

To obtain this head position information, the modulated RF envelope signal reproduced by the head 24 is coupled to detection circuitry provided by an outer loop 78 of the servo circuit 66. To an extent, the tracking error signal which varies the amplitude of the reproduced RF envelope is exhibited as a double-side-band, suppressed carrier (DSB/SC) modulation of the detector fundamental frequency. Therefore, to recover the tracking error signal, the reproduced signal output from the head 24 is coupled for processing by a simple amplitude modulation RF envelope detector 79, which is constructed to recover the dither signal fundamental and its sidebands. The output signal from envelope detector 79 is merely a rectified version of the reproduced signal, containing the fundamental and sideband components of the dither frequency, $f_D$. The output of the envelope detector 79 is connected to the signal input 80a of a second detector 80, which is a synchronous amplitude modulation detector.

Sync detector 80 is of conventional design of the kind which operates on the principle of coherently detecting the amplitude and polarity of an unknown input signal with reference to the phase of a reference signal of the same frequency. Such detectors provide a rectified output having the amplitude of the unknown input signal and being positive when the two signals are in phase and negative when the two signals are 180 degrees out of phase The reference input 80b of the detector 80 adjusts the reference dither frequency provided by oscillator 74 to be at the proper 0° or 180° with respect to the fundamental dither frequency component present in the input to the sync detector 80. Since the signal present at the input 80b of sync detector 80 will have a component at the fundamental dither frequency, $f_D$, whenever an error occurs in head track position, sync detector 80 will provide at its output 80c, a track error signal representative of the head track position error. The amplitude of the error signal is proportional to the amount that the bias position of head 24 is displaced from track center. The polarity of the track error signal is indicative of the direction of head displacement from track center.

This compensated track error signal corresponds to the low rate or DC error in the position of the head 24 relative to the track 69. The low rate error signal is applied to the summing circuit 75 where it is summed with the dither frequency output from the oscillator 74. The composite signal resulting therefrom is fed from the output of the summing circuit 75 to the drive amplifier 76 which applies the composite error signal to a summing circuit 82 of the inner loop 77.

The inner loop 77 of the servo circuit 66 is a closed loop servo that provides a transfer function in which a one volt input to the summing circuit 82 equals 4 mils displacement at the head 24. Photocells 59 and 60 are disposed opposite the LED 58, with the window 46 of the head support member 14 disposed therebetween. At a centered position of the head 24, the photocells 59, 60 are so disposed opposite the LED 58 that the amount of light cast on photocells 59, 60 through the window 46 is equal for both photocells 59, 60, resulting in a minimum (zero) feedback signal being input to the summing circuit 82 from the inner loop 77.

From the inner loop 77, the pair of photocells 59, 60 provide respective inputs to a difference amplifier 83, each input proportional to the amount of light cast on a respective photocell 59 or 60, the inputs to the difference amplifier 83 generating a position sensitive differential output which is applied as a feedback signal to the summing circuit 82 to modify the error signal from the amplifier 76. The position compensated output of the summing circuit 82 is applied to a coil driver 84, which supplies a position signal input to the coil 30 to drive the head 24 to a positional equivalent of the signal output of the summing circuit 82. An output 85 of the coil 30 is connected to ground.

The magnetic head assembly of the present invention has been described in connection with the tracking of a tape track on a magnetic tape used in conjunction with a video recorder, the specific environment for which it was designed and therefore considered to be the "best mode" of the invention.

However, it should be recognized that such an assembly can have substantially wider use than the described preferred embodiment and such assembly is not limited to the specific structure of the preferred embodiment. The appended claims are intended to set forth the breadth and scope of the invention described herein.

What is claimed is:

1. A magnetic head assembly for effecting displacement of a magnetic head transversely of a track recorded on a magnetic tape disposed on a rotatable drum, said assembly including a magnetic head, a base mounted on the drum, and head mounting apparatus extending from the base for mounting the head, said head mounting apparatus comprising:

an elongated rigid head support member, said member being wedge-shaped over its entire length;

a flexure member connecting one end of the support member to the base, said flexure member being relatively short as compared to the support member; and a drive assembly mounted on said base and said support member for driving the support member for rapidly positioning the head from a first position to a second and successive positions relative to the track on the tape, the support member being sufficiently rigid to reduce undesirable resonances therein under repetitive loading conditions and cooperative with the flexure member to effect the rapid, head positioning relative to the track in response to the drive assembly.

2. A magnetic head assembly as claimed in claim 1 wherein head support member has one end connected to the flexure member with the end of the support member opposite from said one end defining with said one end a neutral plane of the support member and wherein the flexure member has a mid-plane coextensive with the neutral plane of said support member, said opposite end of the support member being configured to support the head, said head defining a track width with a mid-plane of the head being mutually aligned with the neutral plane of the support member.

3. A magnetic head assembly as claimed in claim 2 wherein the opposite of the end of the support member is tilted away from the tape, with said head engaging the opposite end of said support member so as to align the mid-plane of the head with the neutral plane of the support member.

4. A magnetic head assembly as claimed in claim 2 wherein the opposite end of the support member is tilted toward the tape, with said flexure member engaging the opposite end of said support member so as to align the mid-plane of the head with the neutral plane of the support member.

5. A magnetic head assembly as claimed in claim 2 wherein a notch is provided in the opposite end of the support member, with the head received in the notch and the mid-plane of the head in alignment with the neutral plane of the support member.

6. A magnetic head assembly as claimed in claim 2 wherein a transducer support plate is mounted at the opposite end of the said support member, with the head mounted on the support plate, said support plate being disposed sufficiently below the neutral plane of the support member so as to align the mid-plane of the head with the neutral plane of the support member.

7. A magnetic head assembly as claimed in claim 2 wherein in the head has a notch and the opposite end of the support member engages the notch of the head for mounting the head on the support member, the head being mounted on the support member so as to align the mid-plane of the head with the neutral plane of the support member.

8. A magnetic head assembly for effecting displacement of a magnetic head transversely of a track recorded on a magnetic tape disposed on a rotatable drum, said assembly including a magnetic head, a base mounted on the drum, and head mounting apparatus extending from the base for mounting the head, said head mounting apparatus comprising:

an elongated rigid head support member, said member being wedge-shaped over its entire length and having a bottom wall and opposed laterally spaced side walls connected thereto and at least one laterally extending cross member connected to the side walls to form an open rigid structure, a pair of hinges extending from the end of said support member proximate to the base, said hinges being relatively short compared to the support member and connecting the latter to the base, and a drive assembly mounted on said base and said support member for driving the support member and for rapidly positioning the head from a first position to a second and successive head positions which follow the track on the tape, the support member being sufficiently rigid to reduce undesirable resonances therein under repetitive loading conditions and cooperative with the hinges to effect rapid, repetitive and controlled changes in said head positions in response to the drive assembly.

9. A magnetic head assembly as claimed in claim 8 wherein the bottom wall and each side wall converge from maximum dimensions proximate to the base to minimum dimensions at the head to form a truncated generally triangular shape whereby to maximize the rigidity of the member while reducing its weight, to achieve an optimum strength-weight ratio for the support member.

10. A magnetic head assembly as claimed in claim 9 wherein the bottom and side walls have openings provided therein, to reduce the weight of the support member without sacrificing its rigidity, by producing a lattice-type beam structure.

11. A magnetic head assembly as claimed in claim 10, wherein the cross member is disposed generally perpendicular to the bottom wall and has a window opening therein.

12. A magnetic head assembly for effecting displacement of a magnetic head transversely of a track recorded on a magnetic tape disposed on a rotatable drum, said assembly including a magnetic head, a base mounted on the drum, and apparatus extending from the base for mounting the head, said head mounting apparatus comprising:

an elongated rigid support member having opposed side walls, said member being wedge-shaped over its entire length;

a flexure member connecting one end of the support member to the base and being relatively short as compared to the support member, a drive assembly mounted on said base and said support member for driving the support member and rapidly positioning the head from a first position to a second and successive head positions which follow the tracks on the tape, the support member being sufficiently rigid to reduce undesirable resonances therein under repetitive loading conditions and cooperative with the flexure member to effect rapid, repetitive and controlled changes in said head positions in response to the drive assembly; and position sensing apparatus disposed on the base relative to the head for sensing the position of the head relative to the track, the drive assembly and the position sensing apparatus being cooperative to effect said rapid, repetitive and controlled head positions relative to the track, said position sensing apparatus including:

a cross member extending transversely of the support member and connected to the side walls thereof;

a window opening in the cross member;

support structure overlying the cross member and secured to the base;

a radiant energy-producing element mounted in the support structure and disposed on one side of the window opening; and at least one photo-sensitive element mounted in the support structure and disposed on the side of the window opening opposite the light producing element, with the amount of light cast on the photo-sensitive element through the window opening being proportional to the positional input to the drive assembly.

13. A magnetic head assembly for effecting displacement of a magnetic head transversely of a track recorded on a magnetic tape disposed on a rotatable drum, said assembly including a magnetic head, a base mounted on the drum, and head mounting apparatus extending from the base for mounting the head, said head mounting apparatus comprising:

an elongated rigid wedge-shaped head support member;

a flexure member extending from the support member to the base to secure the support member to the base, said flexure member being relatively short as compared to the support member;

a drive assembly mounted on the support member and on the base for rapidly and repetitively driving the head; and position sensing apparatus for sensing the position of the head relative to the track, the drive assembly and the position apparatus cooperative to effect rapid and precise movements of the head through successive head positions relative to the track.

14. A magnetic head assembly for effecting displacement of a magnetic head transversely of a track recorded on a magnetic tape disposed on a drum, said assembly including a magnetic head, a base mounted on the drum, and head mounting apparatus extending from the base for mounting the head, said head mounting apparatus comprising:

a head support member including an elongated structure having a bottom wall and a pair of side walls connected to and projecting perpendicularly from the bottom wall, a pair of hinges connected to and extending from respective side walls and at least one cross member joining the side walls to form a generally wedge-shaped support member;

said hinges being relatively short as compared to the support member and being connected to the base to secure the support member thereto; and a motor drive assembly including a voice coil motor support spaced from the base on the support member and proximate to the head, a voice coil motor retained in the motor support, and a complementary coil element disposed on the head support member in alignment with the voice coil motor for driving the head support member for rapidly positioning the head from a first position to a second and successive head positions relative to the track, the head support member being cooperative with the hinges to effect rapid, repetitive and controlled changes in the head position in response to the drive assembly.

15. A position control system for a magnetic head assembly of a magnetic recorder for effecting displacement of a magnetic head transversely of a track recorded on a magnetic tape disposed on a rotatable drum, said assembly including a magnetic head, a base mounted on the drum, and head mounting apparatus extending from the base for mounting the head, said position control system comprising:

an elongated rigid wedge-shaped head support member;

a flexure member substantially shorter than the support member and connected to and extending between the support member and the base for securing the support member to the base;

a drive assembly mounted on the head support member and the base for rapidly and repetitively driving the head from a first to second and successive positions on the tape; and position sensing apparatus for sensing the position of the head relative to the track including position control circuitry effecting the position of the head, the head support member being sufficiently rigid to reduce undesirable resonances in the member under repetitive loading conditions and being cooperative with the flexure member to effect rapid, repetitive and controlled changes in head position produced by the drive assembly and cooperative with the position sensing apparatus to effect said rapid, repetitive and controlled head position changes relative to the track.

16. A magnetic head mounting apparatus for effecting displacement of a magnetic head transversely of a track recorded on a magnetic tape disposed on a rotatable drum, said apparatus including a base and a transducer head defining the track, said apparatus comprising:

an elongated rigid head support member having a first end and extending therefrom to provide a mounting surface for the head at a second end opposite from the first end, a hinge connecting the first end of the support member to the base, said hinge being relatively short relative to the support member, said second end of the support member defining a neutral plane of the support member coextensive with a mid-plane of the hinge, said second end of the support member being configured to support the head with a mid-plane of the head mutually aligned with the neutral plane of the support member, and a drive assembly for rapidly effecting the transverse displacement of the support member and the head relative to the track.

* * * * *